May 16, 1967  H. P. LUDWIG  3,319,301
INJECTION MOLDING SHOE BOTTOMS
Filed Oct. 20, 1964  2 Sheets-Sheet 1

INVENTOR.
Herbert P. Ludwig
BY
Roberts, Cushman & Grover
ATT'YS

United States Patent Office 3,319,301
Patented May 16, 1967

3,319,301
INJECTION MOLDING SHOE BOTTOMS
Herbert P. Ludwig, Desmastrasse 112, Usen,
near Bremen, Germany
Filed Oct. 20, 1964, Ser. No. 405,147
5 Claims. (Cl. 18—42)

This invention relates to apparatus for injection of soles or parts thereof of different kinds of plastic and/or different colored plastics to shoe uppers, and especially to apparatus which comprises a sole plate and a ring within which the sole plate is vertically movable relative to the bottom of an upper supported by a last held engaged with the ring above the sole plate.

It is customary in apparatus of this kind to employ a split ring containing one or more injection passages which can be aligned with one or more passages in the sole plate to conduct the plastic bottom-forming compositions to the mold cavity so as to form multipart soles such as an inner sole, an outer sole, sole edges, and the like, and by adjustment of the heightwise position of the sole plate in the ring to inject bottom-forming composition of one kind or color to one part of the cavity exclusively of another part. These passages have heretofore been confined to the dividing plane of the mold which is along a median from the heel to toe and hence when the molding composition is relatively viscose and paste-like, such as polyvinyl chloride which is used extensively for bottom-forming, it becomes difficult to obtain a rapid and uniform flow into the mold cavity when the composition is entering only along the median line since the cooling effect of the surface of the mold and surface adhesion retards flow laterally from the median line toward the edges and particularly into such remote places as the peripheral edge if it is desirable to have a thin sole edge or foxing at the edge without employing excessive pressures. The principal objects of this invention are, accordingly, to provide for improved and rapid distribution of the molding compound so as to fill the entire mold immediately and remotely with respect to the entrance of the compound into the cavity at a lower pressure than has heretofore been possible.

According to the invention, the sole plate contains passages which are located at different levels therein which are mutually exclusive of each other, the passages at one level entering the mold cavity close to the wall of the cavity to conduct the molding compound into the mold cavity at a plurality of points marginally thereof without the latter having to travel over the interior surface of the mold to said marginal portion and the passages at the other level entering the mold cavity intermediate the wall and the median of the sole plate to conduct the molding compound to the entire bottom surface of the shoe. The passages at the one level may enter the bottom of the mold cavity through the upper surface of the sole plate adjacent the wall of the ring, or the ring may contain a groove peripherally of the mold cavity and the passages enter the groove below the surface of the sole plate. The passages in each layer preferably diverge from the median line of the mold cavity. The passages at the one level comprise a main passage extending from the heel end to the toe and inclined branch passages extending transversely from the main passage. The passages at the other level comprise a main passage extending from the heel end to the forepart and vertical passages which extend upwardly from the main passage into the heel and forepart through the upper surface of the sole plate. All of the passages increase in cross-section toward their discharge ends. The passages may be formed in the sole plate or the sole plate may be made hollow and the passages comprised of tubes secured therein in appropriate positions.

The invention will now be described in greater detail with reference to the accompanying drawings wherein.

Figure 1:
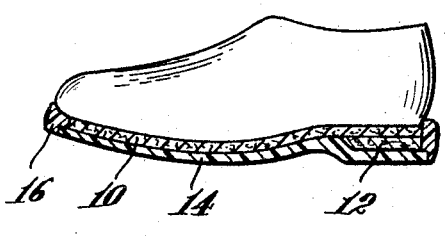
FIG. 1 is an elevation of a shoe with a multipart sole, the latter being shown in longitudinal section.

Referring to FIG. 1, there is shown a shoe to which there is attached a multipart sole comprised of an inner sole 10 and heel 12 made of felt or similar material, an outer sole 14 made of plastic and an edge 16 also made of plastic. The outer sole 14 and edge 16 can be made of different types of plastic and/or different colored plastic and, as herein shown, the upper portion of the edge 16 contacts the lower part of the upper and the lower part of the edge is flush with the lower or tread surface of the outer sole.

Figure 4:
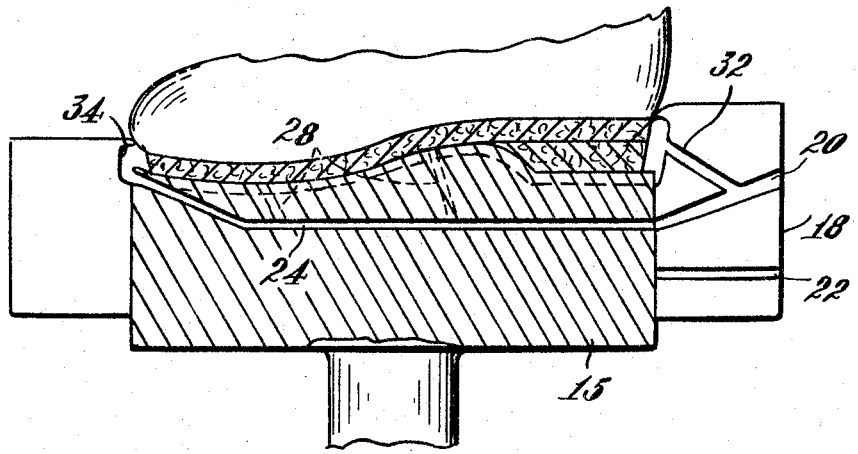
FIG. 4 is a longitudinal section taken on the line 4—4 of FIG. 3.
Figure 5:
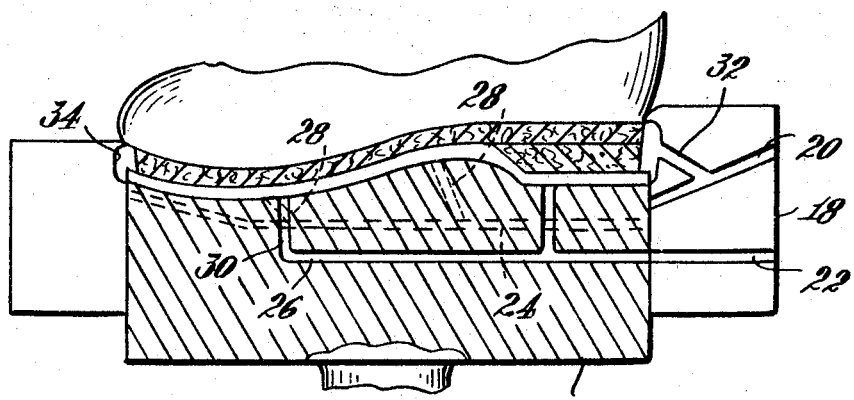
FIG. 5 is a longitudinal section taken on the line 5—5 of FIG. 3.

The mold assembly for molding a bottom such as shown in FIG. 1 comprises a sole plate 15 movable heightwise in a ring 18 to provide a mold cavity of variable depth beneath the bottom of a shoe mounted on a last, supported on the ring above the sole plate. The ring 18 is divided into two halves along a median extending from the heel to the toe and injection of different types or colors of the bottom-forming compound is effected through channels 20 and 22 formed in the parting faces of the ring halves. Each of the channels 20 and 22 is arranged to conduct the bottom-forming compound to a predetermined part of the mold cavity. As shown in FIGS. 4 and 5, the bottom-forming composition for the edge 16 is injected by way of the channel 20 and the bottom-forming composition for the outer sole 14 by way of the channel 22. The injection units for supplying the bottom-forming compound to the mold assembly through the channels 20 and 22 are not shown because they are not part of the invention.

In order to achieve satisfactory and rapid distribution of the bottom-forming composition in the mold cavity at a comparatively low injection pressure there are provided, in accordance with this invention, additional channels 24 and 26 in the sole plate 15, these channels, in turn, being provided with branch channels 28 and 30 leading to the mold cavity. The branch channels 28 and 30 are arranged according to the kind of bottom-forming composition that is to be injected. As illustrated in the aforesaid assembly shown in FIG. 4, injection of the material for the outsole 14 takes place through channel 26 and two branch channels 30. The distribution of the mold compound to form the edge 16 is effected through a branch channel 32 in the ring extending from the channel 20, and through the channel 24 and branch channels 28. Injection to form the edge 16 takes place marginally of the mold cavity at the heel, toe and along the sides.

Figure 3:
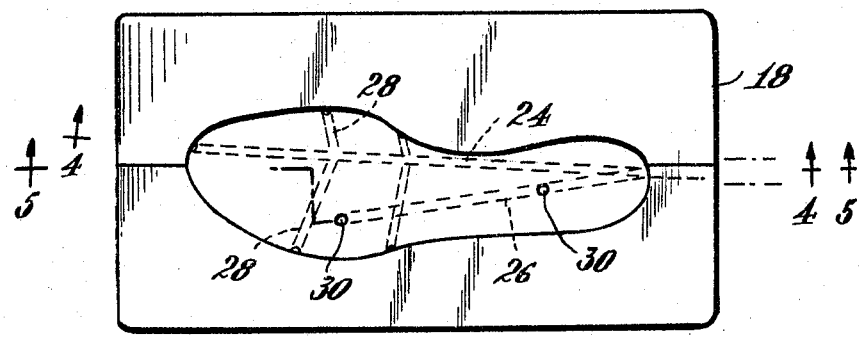
FIG. 3 is a plan view of the mold assembly.

The ring halves contain channels 34 peripherally of the mold cavity with which the ends of the channels 24, 28 and 32 are in communication and wherein the end of the channel 24 and the ends of the branch channels 28 enter the channels 34 below the surface of the sole plate. The ends of the branch channels 30, extending from the channel 26, enter the mold cavity through the bottom surface of the sole plate as shown in FIG. 3. The channels for conducting bottom-forming composition to the edge are situated in a plane above those which conduct the bottom-forming composition to the bottom.

In making the shoe according to FIG. 1, the sole plate 15 is raised to the position shown in FIG. 4, so as to press the inner sole and heel against the bottom part of the upper. In this position the channel 20 in the mold ring aligns with the channel 24 in the sole plate and the extremities of the channel 24 and the branch channels 28 are in communication with the channels 34 in the ring thus providing for conducting bottom-forming composition into the channels 34 about the peripheral edge of the insole and heel. As illustrated, the channels 34 extend downwardly below the surface of the insole and heel by an amount corresponding to the thickness of the outsole which is to be applied, so that the lower part of the edge 16 will be flush with the lower or tread surface of the outsole which is to be applied.

After the bottom-forming composition injected into the channel 34 has sufficiently hardened, the sole plate 15 is lowered, as shown in FIG. 5, a distance to correspond to the thickness of the outsole to be applied which brings the channel 22 in the ring into alignment with the channel 26 in the sole plate. In this position the channel 20 will be covered by the sole plate and now the bottom-forming composition will be injected into the mold cavity to form the outer sole through the channel 22, channel 26 and branch channels 30. Entrance of the branch channels 30 into the bottom of the mold cavity through the upper surface of the sole plate is arranged and provides for uniform and rapid distribution of the bottom-forming composition throughout the bottom area. Following hardening of the outer sole, the sole plate is lowered, the ring halves separated and the finished shoe removed.

A plastic inner sole and heel may be formed by omitting the felt inner sole and heel, raising the sole plate to a position spaced from the bottom of the upper corresponding to the thickness of the omitted felt inner sole and heel, and then injecting the bottom-forming composition through the channels 20, 24, 28 and 32. The edge, in this case, will be integral with the inner sole and heel. The outer sole may then be applied to the inner sole as previously described, within the downwardly projecting portions of the edge strip thereby providing the same appearance, to wit, an edge of one kind of plastic or one color and an outer sole of another kind or color, except that the inner sole and heel will be plastic instead of felt.

By a slight relocation of the channels in the ring and sole plate, it is possible to employ the felt inner sole and felt heel, raise the sole plate up to the inner sole and heel, leaving however a shallow space, and then inject the bottom-forming composition so as to form a thin plastic layer over the entire bottom and at the edge to cover the felt inner sole and heel and form the edge strip. After hardening the sole plate may be lowered and the outer sole applied as heretofore explained.

Figure 2:
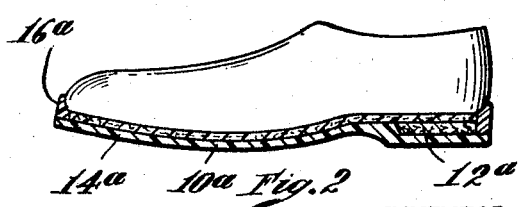
FIG. 2 is a view similar to FIG. 1, showing a multipart sole of different construction in longitudinal section.

The bottom shown in FIG. 2 comprises an inner sole 10a and heel 12a of felt or the like, a plastic edge strip 16a and a plastic outer sole 14a. In this form the lower edge of the edge strip 16a terminates at the lower surface of the inner sole so that the edge of the outer sole coincides with the outer side of the edge strip.

Figure 6:
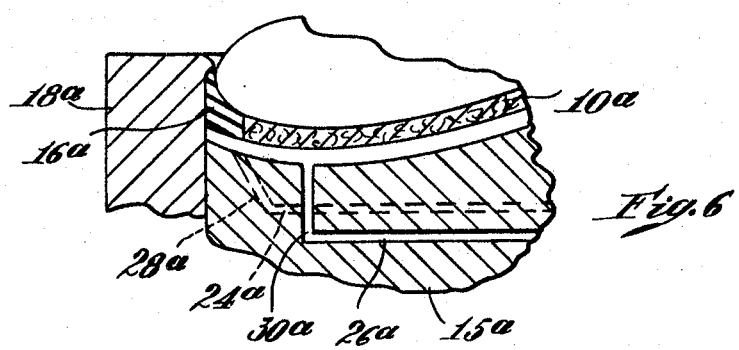
FIG. 6 is a fragmentary section taken longitudinally of a mold assembly for making the shoe shown in FIG. 2.

To attach a bottom such as shown in FIG. 2, a modificaion of the mold assembly is employed, as shown in FIG. 6, wherein a sole plate 15a and ring 18a are used as described in FIGS. 2 and 3. The sole plate differs however in that the channel 24a enters the mold cavity through the bottom of the sole plate and the ring contains no peripheral channel corresponding to the channel 34 shown in FIGS. 4 and 5. With this form of assembly the sole plate 15a is raised into engagement with the inner sole 10a and heel 12a, and bottom-forming composition is injected through the channel 24a and branch channels 28a into the mold cavity into the space between the wall of the ring and the peripheral edge of the inner sole and heel so as to form the edge 16a, the upper portion of which has contact with the upper of the shoe and the lower portion of which is flush with the lower surface of the inner sole and heel. After the edge has had time to set or harden, the sole plate 15a is lowered the desired amount to form the outsole 14a which displaces the channel 20a relative to the channel 24a and aligns the channel 22a with the channel 26a so that now the bottom-forming composition is injected through the latter channel and its branches 30a into the mold cavity through the bottom to form the outer sole. When the injected composition has sufficiently set or hardened, the sole plate is lowered, the mold halves separated and the shoe removed. In this modification the edge strip 16a extends further up on the upper in the form of a foxing strip. As related above, the felt inner sole and felt heel may be omitted and the entire insole, heel and edge strip formed of plastic, or a thin layer of plastic may be applied to the felt inner sole and felt heel, followed by an application of the outer sole.

The channel and branch channels in the sole plate and the mold ring are shaped so that they increase in cross-section toward the mold cavity, specifically being conical, so that the bottom-forming compound residue can be easily removed from the open ends of the channel and branch channels.

Figure 7:
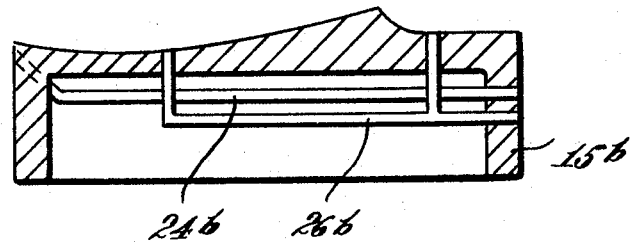
FIG. 7 is a longitudinal section of a hollow mold plate in which the passages are provided by tubes fixed in suitable positions therein.

In the mold assemblies shown in FIGS. 3 to 6, inclusive, the channels are formed in the metal of the ring and sole plate by casting or drilling and where there are a number of such channels it becomes difficult to form these channels. FIG. 7 illustrates a simplification of a sole plate 15b which is made hollow and in which the channels are provided by pipes 24b and 26b which are connected to suitable bores in the wall of the sole plate, for example by welding. The ring may also be hollow and provided, as heretofore described, with pipes 20b and 22b which may be aligned, respectively, with the pipes 24b and 26b.

As constructed, the mold assembly enables attaching bottoms to shoe uppers comprised of plastics of different characteristics and/or color and further enables a more uniform distribution of the plastic to the part of the upper to which it is to be formed at a much lower pressure than heretofore possible.

It should be understood that the present disclosure is for the purpose of illustration only and that this invention includes all modifications and equivalents which fall within the scope of the appended claims.

I claim:

1. Apparatus for injection molding of a bottom to a lasted upper comprising a sole plate, a ring surrounding the sole plate, a lip peripherally of the ring extending inwardly therefrom relative to the sole plate, passages in the sole plate and ring at different levels, means for moving said sole plate in the ring relative to the lip to a first position in which the sole plate has contact with the bottom of the lasted upper, in which position there is a cavity surrounding the bottom, and said passages are in communication with each other and with said cavity surrounding the bottom, and to a second position in which the sole plate is spaced from the bottom, in which position there is a cavity beneath the bottom, and said passages are in communication with each other and with the space beneath the bottom.

2. Apparatus for injection molding of a bottom to a lasted upper comprising a sole plate, a ring surrounding the sole plate, said ring containing an internal re-entrant groove peripherally thereof, said sole plate being movable heightwise in the ring relative to said groove, ports spaced at a plurality of points in the groove, ports in the sole plate, passages in the sole plate located at different levels, passages in the ring located at different levels, said sole plate being movable in the ring relative to the re-entrant groove to a first position to align the passages at the higher level therein with the passages at the higher level in the ring at which level the sole plate has contact with the bottom of the lasted upper, and said passages in the sole plate and ring are in communication with the ports in the re-entrant groove, and to a second position to align the passages at the lower level therein with the passages at the lower level in the ring at which level the sole plate is spaced from the bottom of the upper, and the passages at said lower level in the plate and ring provide communication with the space between the bottom and the sole plate through the ports in the sole plate.

3. Apparatus for injection molding according to claim 1, wherein the sole plate in said one position is above the level of the bottom of the re-entrant groove.

4. Apparatus for injection molding of a bottom to a lasted upper comprising a sole plate, a ring surrounding the sole plate, a lip peripherally of the ring extending inwardly relative to the sole plate, said sole plate being movable heightwise in the ring relative to said lip, ports spaced at a plurality of points peripherally of the sole plate, ports in the sole plate inwardly of the peripheral edge, passages in the sole plate located at different levels, passages in the ring located at different levels, said sole plate being movable in the ring relative to the lip to a first position to align the passages at the higher level therein with the passages at the higher level in the ring at which level the sole plate has contact with the bottom of the lasted upper, and said passages in the sole plate and ring are in communication with the ports in the peripheral edge of the sole plate, and to a second position to align the passages at the lower level therein with the passages at the lower level in the ring at which level the sole plate is spaced from the bottom of the upper, and said passages at said lower level in the sole plate and ring provide communication with the space between the bottom of the sole plate through the ports in the sole plate inwardly of the peripheral edge.

5. Apparatus according to claim 1, wherein the sole plate is hollow and the passages are constituted by pipes secured in the hollow sole plate in appropriate position.

References Cited by the Examiner

UNITED STATES PATENTS

| 2,279,380 | 4/1942 | Reid | 249—107 |
|---|---|---|---|
| 2,714,949 | 8/1955 | Morin. | |
| 3,031,722 | 5/1962 | Gits | 18—42 XR |
| 3,109,199 | 11/1963 | Hardy | 18—42 XR |
| 3,160,921 | 12/1964 | Ludwig | 18—42 |
| 3,164,864 | 1/1965 | Kobayashi | 249—105 |

FOREIGN PATENTS 955,770   4/1964   Great Britain.

WILLIAM J. STEPHENSON, *Primary Examiner.*

J. HOWARD FLINT, JR., *Examiner.*